Patented Apr. 29, 1952

2,594,303

UNITED STATES PATENT OFFICE 2,594,303

MODIFIED DRYING OILS

Charles H. Fisher, New Orleans, La., Morris Zief, Philadelphia, Pa., and Robert C. Hockett, Larchmont, N. Y., assignors to the United States of America as represented by the Secretary of Agriculture No Drawing. Application August 18, 1950, Serial No. 180,318

15 Claims. (Cl. 260—406)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to us of any royalty thereon.

This invention relates to oxidative polymerization products of unsaturated compounds and to methods of producing them. More particularly the invention is concerned with a method of modifying the characteristics of drying oils, by incorporating therein alkenyl ethers of aliphatic polyhydroxy compounds, and the valuable products obtainable thereby.

We have found that the conversion of a drying oil into a solid or non-fluid material on contact with free oxygen occurs more rapidly and yields products having improved properties if the drying oil is subjected to the action of free oxygen in the presence of a polymerizable, organic solvent soluble monomeric ether of an aliphatic polyhydroxy compound containing an aliphatic, monounsaturated olefinic ether group having from 3 to 4 carbon atoms and comprising the grouping

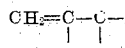

said ether being liquid at ordinary temperature in its monomeric form.

In accordance with the preferred method of our invention a drying oil in admixture with the alkenyl ether of the aliphatic polyhydroxy compound is contacted with oxygen, preferably by passing a current of oxygen or of a free-oxygen containing gas such as air, through the body of the mixture for a length of time sufficient to cause an increase in the viscosity of the mixture. The "blown" products thus obtained on stopping this viscosity increasing treatment before the formation of a gel occurs are essentially homogeneous, solvent-soluble, partially polymerized materials which undergo little alteration on prolonged storage, particularly in solution, but are rapidly polymerized to dry non-tacky material on further exposure to oxygen or air and are thus adapted for use, either as such or in combination with pigments, synthetic or natural resins, plasticizing agents and the like, in the production of films, coating compositions, plastics and other materials by methods analogous to those employed in the manufacture of similar products comprising, or produced from, drying oils.

Alkenyl ethers of aliphatic polyhydroxy compounds suitable for use singly or in combination, in our process are the polymerizable, organic solvent soluble alkenyl ethers which in their monomeric form are liquid at ordinary temperatures. Such ethers include the allyl, methallyl and haloallyl, such as chloroallyl, ethers of aliphatic compounds containing from 2 to 8 hydroxyl groups. Suitable alkenyl ethers are for example those of: glycols like ethylene glycol or butylene glycol; higher polyhydric alcohols such as glycerol, erythritol or pentaerythritol; pentanols and hexanols like xylitol, arabitol, mannitol, sorbitol, dulcitol or inositol; alcohol-ethers like dipropylene glycol or dipentaerythritol. Also the alkenyl glucosides or galactosides and the allyl, methallyl and chloroallyl ethers of sucrose as well as the corresponding alkenyl ethers of substituted aliphatic polyhydroxy compounds, such as allyl methyl glucoside; allyl and methallyl ethers of aliphatic polyhydroxy compounds containing unsaturated or saturated carboxylic ester groups like the acrylic, methacrylic, haloacrylic, acetic, propionic, acid esters of sucrose or mannitol, and other polymerizable liquid alkenyl ether monomers, obtainable from aliphatic polyhydroxy compounds essentially as described by: Nichols et al., J. Am. Chem. Soc. 66, 1625–1627 (1944); 67, 46–49 (1945); 68, 2020–2022 (1946); Talley et al., Ibid. 67, 2037–2039 (1945); Wrigley et al., Ibid. 70, 2194–2196 (1948); Zief and Yanovsky in their application Serial No. 21,545, filed April 16, 1948, now Patent No. 2,541,142; Schwartz, Talley, Zief, and Fisher in their application for "Ether-Esters of Polyhydroxy Compounds," Serial No. 111,962, filed August 23, 1949.

The use of sucrose alkenyl ethers and especially of allyl sucrose containing at least 4 allyl ether groups is preferred in view of their ready availability and the superior products thereby obtained.

The method of this invention is applicable to the production of modified compositions from treated or untreated drying oils, such as, raw or boiled linseed oil, dehydrated castor oil, oiticica oil, tung oil and in general from fatty oils which undergo an increase in viscosity on exposure to air, such as the semi-drying oils like soybean oil, as well as from various mixed glycerides and polyhydric alcohol esters of drying oil acids such as, oleic, linoleic, linolenic, palmitoleic, eleostearic and other unsaturated long chain aliphatic monocarboxylic acids containing at least about 12 carbon atoms and especially those containing a plurality of double bonds.

The process can be conducted at room temperature or with application of heat up to temperatures which cause incipient discoloration and/or decomposition of the material treated and can be conducted in the presence of conventional driers, such as the oil soluble metal salts of organic acids like cobalt octoate or naphthenate.

Since the reaction rate increases with the temperature it is usually advantageous to conduct the process at elevated temperature for example at about 100° C.

The proportions of alkenyl ethers used as the upgrading or modifying agents in our process can be varied within wide limits depending on the nature of the constituents of the mixture and the desired results. Although appreciable effects in controlling the polymerization rate up to the gelation point are attainable with smaller amounts of alkenyl ethers, best results are usually obtained on using from about 10 to about 50 percent of alkenyl ether on the basis of the total weight of the mixture.

The following examples are given as illustrative embodiments of a manner in which the invention may be carried out in practice. Samples of alkenyl ethers of aliphatic polyhydroxy compounds were blended in varying weight ratios with drying and semi-drying oils, with and without addition of cobalt drier and the gelation time of the resulting mixtures was determined at 100° C. essentially by the procedure described by Nichols et al., J. Am. Chem. Soc. 68, 2020-2022 (1946). Some of the results thus obtained are shown in the following table which also includes for purpose of comparison the gelation time of the alkenyl ethers and oils used.

| | Gelation time minutes |
|---|---|
| Tung oil | 121 |
| Oiticica oil | 136 |
| Boiled linseed oil | 455 |
| Dehydrated castor oil | 522 |
| Raw linseed oil | 947 |
| Soybean oil | 1275 |
| Boiled linseed oil+0.2% cobalt | 231 |
| Soybean oil+0.2% cobalt | 367 |
| Allyl sucrose, about 6 allyl groups | 168 |
| Allyl dipentaerythritol, about 6 allyl groups | 235 |
| Allyl sorbitol, about 6 allyl groups | 238 |
| Allyl sucrose {about 6.5 allyl groups} propionate {about 1.0 propionyl group} | 258 |
| Allyl mannitol, about 5.1 allyl groups | 300 |

Blown soybean oil gave films that were tacky after air-drying for two weeks. The drying time of a 50:50 soybean oil-allyl sucrose mixture was eight hours. An 80:20 blown mixture of boiled linseed oil-allyl sucrose dried in four hours compared to twenty-one hours for blown linseed oil itself. The Sward hardness (12-14) of films from allyl sucrose mixtures was superior to those of soybean oil (0-1) or linseed oil (2). The resistance of films from soybean oil-allyl sucrose mixtures to water and various organic solvents was superior to resistance of soybean oil or allyl sucrose films.

We claim:

1. A composition comprising the oxidative copolymerization products of a drying oil and a polymerizable, organic solvent soluble monomeric ether of an aliphatic polyhydroxy compound, said ether containing in the ether group an alkenyl radical which is free of substituents other than halogen, which has from 3 to 4 carbon atoms and which contains the grouping $$CH_2=C-C-$$

said ether being liquid in the monomeric form.

2. The composition of claim 1 wherein the ether is a sucrose ether.

3. The composition of claim 1 wherein the ether is allyl sucrose.

4. The process comprising forming a mixture of a drying oil with a liquid, polymerizable, organic solvent soluble monomeric ether of an aliphatic polyhydroxy compound, said ether containing in the ether group an alkenyl radical which is free of substituents other than halogen, which has from 3 to 4 carbon atoms, and which contains grouping $$CH_2=C-C-$$

and contacting the mixture with a free-oxygen containing gas.

5. The process of claim 4 wherein the ether is a sucrose ether.

6. The process of claim 4 wherein the ether is allyl sucrose.

7. A process which comprises subjecting a drying oil to oxidative polymerization by passing a current of free-oxygen containing gas through a drying oil having incorporated therein, in an amount sufficient to enhance the polymerization rate of the oil, an upgrading agent comprising

| Example | Oil | Percent | Alkenyl Ether | Percent | Gelation Time (minutes) |
|---|---|---|---|---|---|
| I | Tung Oil | 50 | Allyl Sucrose | 50 | 118 |
| II | Oiticica Oil | 50 | do | 50 | 104 |
| III | Boiled Linseed Oil | 50 | do | 50 | 262 |
| IV | Dehydrated Castor Oil | 50 | do | 50 | 297 |
| V | Boiled Linseed Oil | 50 | Allyl Sucrose Propionate | 50 | 305 |
| VI | Soybean Oil | 50 | Allyl Sucrose | 50 | 381 |
| VII | do | 60 | do | 40 | 405 |
| VIII | Raw Linseed Oil | 50 | do | 50 | 500 |
| IX | Soybean Oil | 80 | do | 20 | 610 |
| X | do | 90 | do | 10 | 903 |
| XI | do¹ | 50 | do¹ | 50 | 131 |
| XII | Boiled Linseed Oil¹ | 50 | do¹ | 50 | 140 |
| XIII | Soybean Oil | 50 | Allyl Mannitol | 50 | 626 |
| XIV | do | 50 | Allyl Dipentaerythritol | 50 | 572 |
| XV | do | 50 | Allyl Sorbitol | 50 | 536 |
| XVI | Boiled Linseed Oil | 50 | Allyl Mannitol | 50 | 298 |
| XVII | do | 50 | Allyl Dipentaerythritol | 50 | 303 |
| XVIII | do | 50 | Allyl Sorbitol | 50 | 290 |

¹ Containing 0.2 percent cobalt added as octoate.

The properties of films prepared from 50 percent solutions of the various products in toluene, and containing 0.1 percent cobalt were determined.

a liquid, polymerizable, organic solvent soluble monomeric ether of an aliphatic polyhydroxy compound, said ether containing in the ether group an alkenyl radical which is free of substituents other than halogen, which contains the grouping.

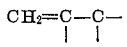

and which has from 3 to 4 carbon atoms, and conducting the polymerization at a temperature below the decomposition temperature of said oil for a length of time sufficient to increase the viscosity thereof.

8. The process of claim 7 wherein the ether is an allyl ether.

9. The process of claim 7 wherein the ether is an allyl ether of a hexahydric alcohol.

10. The process of claim 7 wherein the ether is sucrose allyl ether.

11. The process of claim 7 wherein the ether is allyl sucrose.

12. The process of claim 7 wherein the ether is allyl dipentaerythritol.

13. The process of claim 7 wherein the ether is allyl sorbitol.

14. The process comprising forming a mixture of a drying oil of the group consisting of tung oil, oiticica oil, raw linseed oil, boiled linseed oil, dehydrated castor oil and soybean oil with about 10 to 50 percent by weight of at least one of the allyl ethers of the group consisting of allyl sucrose, allyl dipentaerythritol, allyl sorbitol, allyl sucrose propionate and allyl mannitol and passing a current of free-oxygen containing gas through the mixture at a temperature below the decomposition temperature of the constituents thereof for a length of time sufficient to increase the viscosity of the mixture.

15. The process of claim 14 wherein the current of free-oxygen containing gas is passed through the mixture at about 100° C.

CHARLES H. FISHER.
MORRIS ZIEF.
ROBERT C. HOCKETT.

REFERENCES CITED

The following references are of record in the file of this patent:

UNITED STATES PATENTS

| Number | Name | Date |
|---|---|---|
| 2,285,797 | Bellefontaine | June 9, 1942 |